(12) United States Patent
Bertrand et al.

(10) Patent No.: US 12,451,923 B2
(45) Date of Patent: Oct. 21, 2025

(54) TRANSCEIVER FOR COUPLING TO A GALVANICALLY ISOLATED BUS

(71) Applicant: NXP B.V., Eindhoven (NL)

(72) Inventors: Simon Bertrand, Muret (FR); Laurent Bordes, Aucamville (FR); Tristan Bosvieux, Plaisance du Touch (FR)

(73) Assignee: NXP B.V., Eindhoven (NL)

( * ) Notice: Subject to any disclaimer, the term of this patent is extended or adjusted under 35 U.S.C. 154(b) by 377 days.

(21) Appl. No.: 18/316,301

(22) Filed: May 12, 2023

(65) Prior Publication Data

US 2023/0412208 A1 Dec. 21, 2023

(30) Foreign Application Priority Data

Jun. 15, 2022 (EP) ..................... 22305872

(51) Int. Cl.
*H04B 1/52* (2015.01)
*H04B 1/58* (2006.01)

(52) U.S. Cl.
CPC ............... *H04B 1/52* (2013.01); *H04B 1/586* (2013.01)

(58) Field of Classification Search
CPC ............... H04L 25/4917; H04L 7/0037; H04L 2012/40215; H04L 25/0272; H04L 25/03343; H04L 25/14; H04L 12/40; H04L 7/033; H04L 25/028; H04L 12/40013; H04L 25/49; H04L 12/40032; H04L 25/493; H04L 2025/03363; H04L 25/03038; H04L 25/4902; H04L 2012/4027; H04B 1/16; H04B 1/04; H04B 1/0475; H04B 3/54; H04B 1/3822; H04B 15/005; H04B 15/02; H04B 3/32; H04B 3/462; H04B 3/487; H04B 1/0458; H04B 1/0483; H04B 1/24; H04B 2001/0416; H04B 2001/0433; H04B 2001/045; H04B 3/46

See application file for complete search history.

(56) References Cited

U.S. PATENT DOCUMENTS 8,908,779 B2 12/2014 Douglass
10,146,731 B2 12/2018 Segarra et al.
(Continued)

FOREIGN PATENT DOCUMENTS

WO WO-2007125965 A1 * 11/2007 ........... H04L 25/085

*Primary Examiner* — Golam Sorowar (57) ABSTRACT

A transceiver comprising:
a transmitter configured to transmit a signal comprising differential voltages to at least a first terminal and a second terminal;
at least one receiver;
a controller configured to provide control signals to the transmitter to cause the transmitter to transmit symbols, wherein each symbol comprises a predefined set of said differential voltages including at least a positive differential voltage and a negative differential voltage; and
a signal balance module configured, for one or more symbols, to:
determine a first duration of the positive differential voltage of said one or more symbols;
determine a second duration of the negative differential voltage of said one or more symbols;
based on determination of a difference between the first and second durations, provide for control of the controller or control of the transmitter to reduce the difference between the first and second durations in a further symbol relative to the one or more symbols.

20 Claims, 5 Drawing Sheets

(56) References Cited

U.S. PATENT DOCUMENTS

| | | | |
|---|---|---|---|
| 10,333,579 B1* | 6/2019 | Emira | H03K 17/081 |
| 2004/0047412 A1 | 3/2004 | Wang et al. | |
| 2010/0066725 A1* | 3/2010 | Chen | G09G 5/006 |
| | | | 345/213 |
| 2018/0041282 A1* | 2/2018 | Chen | H04B 10/035 |
| 2021/0050736 A1* | 2/2021 | Bordes | H04L 67/12 |
| 2023/0171132 A1* | 6/2023 | Kim | G01R 31/31703 |
| | | | 375/340 |

* cited by examiner

TRANSCEIVER FOR COUPLING TO A GALVANICALLY ISOLATED BUS

CROSS-REFERENCE TO RELATED APPLICATIONS

This application claims the priority under 35 U.S.C. § 119 of European Patent application no. 22305872.8, filed on 15 Jun. 2022, the contents of which are incorporated by reference herein.

FIELD

The present disclosure relates to a transceiver. In particular, it relates to a differential transceiver for coupling to a galvanically isolated bus.

BACKGROUND

A transceiver may be part of a node and may be configured to transmit and receive signals to another node via a bus. In some circumstances, it may be necessary to isolate the nodes from one another, perhaps because they operate in different voltage domains. Accordingly, a galvanically isolated bus may be used between the nodes and therefore the respective transceivers.

SUMMARY

According to a first aspect of the present disclosure there is provided a transceiver comprising:
 a transmitter configured to transmit a signal comprising differential voltages to at least a first terminal and a second terminal, the first and second terminals configured to be coupled to a galvanically-isolated bus;
 at least one receiver configured to receive the differential voltages from the first terminal and the second terminal;
 a controller configured to provide control signals to the transmitter to cause the transmitter to transmit symbols, wherein each symbol comprises a predefined set of said differential voltages including at least a positive differential voltage and a negative differential voltage; and
 a signal balance module configured, for one or more symbols, to:
  determine a first duration comprising the duration of the positive differential voltage of said one or more symbols transmitted by said transmitter and received by the at least one receiver;
  determine a second duration comprising the duration of the negative differential voltage of said one or more symbols transmitted by said transmitter and received by the at least one receiver;
  based on determination of a difference between the first duration and the second duration of said one or more symbols, provide for one or both of control of the controller or control of the transmitter to reduce the difference between the duration of the positive differential voltage of a further symbol transmitted by said transmitter and the duration of the negative differential voltage of said further symbol transmitted by said transmitter relative to the difference determined for the one or more symbols.

In one or more examples, the signal balance module may provide for one of: modification of the control signals applied to the transmitter for transmitting a further symbol subsequent to said one or more symbols; and control of the transmitter when it transmits a further symbol subsequent to said one or more symbols. Thus, in one or more examples, the modification of the control signals and control of the transmitter is configured to reduce the difference between the first duration and the second duration as would be measured for the subsequent, further symbol; that is the difference between the duration of the positive differential voltage of said further symbol transmitted by said transmitter and the duration of the negative differential voltage of said further symbol transmitted by said transmitter.

In one or more examples, the reduction of the difference may be achieved by controlling the duration of one or both of the positive differential voltage and the negative differential voltage of the further symbol based on the difference (i.e. time difference) determined for the one or more symbols.

In one or more embodiments, said control signals comprise digital signals comprising at least a first digital signal and a second digital signal provided by the controller to the transmitter and wherein the transmitter is configured to transmit the positive differential voltage based on receipt of the first digital signal and transmit the negative differential voltage based on receipt of the second digital signal.

In one or more embodiments, said signal modification module is configured to provide for modification of the duration of one or both of the first digital signal and the second digital signal to provide said reduction in the difference between the first duration and the second duration.

In one or more embodiments, said signal modification module is integrated with said controller.

In one or more embodiments, said signal modification module is configured to provide for control of the transmitter such that the duration of one or both of the positive differential voltage output in response to the first control signal and the negative different voltage output in response to the second control signal is modified to provide said reduction in the difference between the first duration and the second duration.

In one or more embodiments, said symbols that the controller is configured to cause the transmitter to transmit, by provision of said control signals, comprise:
 a first-logic symbol of said symbols, the first-logic symbol comprising a first period comprising the negative differential voltage and a subsequent second period comprising the positive differential voltage; and
 a second-logic symbol of said symbols, the second-logic symbol comprising a first period comprising the positive differential voltage and a subsequent second period comprising the negative differential voltage.

In one or more examples, the symbols additionally include a zero differential voltage in a third period subsequent the second period.

In one or more embodiments, the signal balance module is configured to provide said reduction in the difference between the first duration and the second duration in the further symbol by control of the duration of the second period.

In one or more embodiments, the signal balance module is configured to provide for control of the duration of the second period in the further symbol by one of addition or subtraction of the difference determined to be present between the first duration and the second duration of said one or more symbols.

In one or more embodiments, the signal balance module is configured to repeatedly perform said determination of the first duration, determination of the second duration and determination said difference for each symbol caused to be transmitted by the controller and the transmitter and wherein said further symbol comprises a next symbol for transmission.

In one or more embodiments, the signal balance module is configured to:
  based on the first duration being greater than the second duration for said one or more symbols:
    if the further symbol comprises a first-logic symbol, provide for a decrease in the duration of the second period of the further symbol comprising the positive differential voltage based on said difference between the first duration and the second duration; and
    if the further symbol comprises a second-logic symbol, provide for an increase in the duration of the second period of the further symbol comprising the negative differential voltage based on said difference between the first duration and the second duration.

In one or more embodiments, the signal balance module is configured to:
  based on the first duration being less than the second duration for said one or more symbols:
    if the further symbol comprises a first-logic symbol, provide for an increase in the duration of the second period of the further symbol comprising the positive differential voltage based on said difference between the first duration and the second duration; and
    if the further symbol comprises a second-logic symbol, provide for a decrease in the duration of the second period of the further symbol comprising the negative differential voltage based on said difference between the first duration and the second duration.

In one or more embodiments, the transceiver comprises part of a node of a battery management system, wherein said node provides for one or both of:
  communication between one or more other nodes of the battery management system; and
  monitoring of electrical parameters of one or more battery cells.

In one or more embodiments, said modification of the control signals and said control of the transmitter to reduce the difference between the first duration and the second duration comprises a reduction by the determined difference between the first duration and the second duration of said one or more symbols.

According to a second aspect of the present disclosure there is provided a method for a transceiver, wherein the transceiver comprises a transmitter configured to transmit a signal comprising differential voltages to at least a first terminal and a second terminal, the first and second terminals configured to be coupled to a galvanically-isolated bus; at least one receiver configured to receive the differential voltages from the first terminal and the second terminal; a controller configured to provide control signals to the transmitter to cause the transmitter to transmit symbols, wherein each symbol comprises a predefined set of said differential voltages including at least a positive differential voltage and a negative differential voltage; wherein the method comprises, for one or more symbols:
  determining, by a signal balance module, a first duration comprising the duration of the positive differential voltage of said one or more symbols transmitted by said transmitter and received by the at least one receiver;
  determining, by a signal balance module, a second duration comprising the duration of the negative differential voltage of said one or more symbols transmitted by said transmitter and received by the at least one receiver;
  based on determination of a difference between the first duration and the second duration of said one or more symbols, providing for one or both of control of the controller or control of the transmitter to reduce the difference between the duration of the positive differential voltage of a further symbol transmitted by said transmitter and the duration of the negative differential voltage of said further symbol transmitted by said transmitter relative to the difference determined for the one or more symbols.

In one or more embodiments, the method comprises one of:
  modifying the control signals provided to the transmitter from the controller to effect the reduction in the difference between the first duration and the second duration in said further symbol relative to the one or more symbols; and
  controlling the response of the transmitter to the control signals such that the transmitter to reduce difference between the first duration and the second duration in said further symbol relative to the one or more symbols.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Examples of the present disclosure relate to transceivers for point-to-point communication on a bus. In particular, the bus may comprise a galvanically isolated bus, such that the transceivers, coupled to the galvanically isolated bus, that operate in different voltage domains can communicate with one another.

A battery management system is an example environment in which communication between transceivers is typically provided via a galvanically isolated bus. Thus, a stack of series-connected battery cells may be provided and the transceivers may be part of a node that provides a communication function for a sub-group of the series-connected battery cells. A plurality of nodes may serve different sub-groups of the series-connected battery cells and therefore may operate in different voltage domains. While the transceiver described herein has particular application in the field of battery management systems, the disclosure is not limited thereto.

Figure 1:
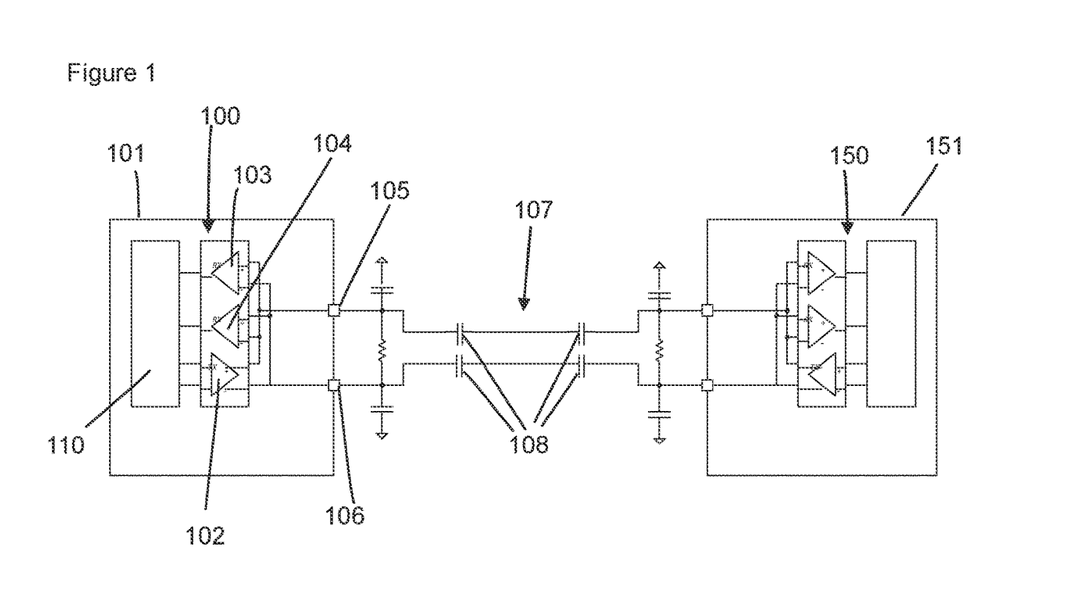
FIG. 1 shows a first example embodiment of a first transceiver and a second transceiver coupled to a galvanically-isolated bus.

FIG. 1 shows a transceiver 100 comprising part of a node 101. The transceiver 100 comprises a transmitter 102 and at least one receiver wherein, in this example, two receivers 103, 104 are present. In this example, one receiver 103 may be configured to detect positive differential voltages and the other 104 may be configured to detect negative differential voltages on the bus.

The transmitter 102 is configured to transmit a differential signal to at least a first terminal 105 and a second terminal 106. The first and second terminals 105, 106 are configured to be coupled to a galvanically-isolated bus 107. The bus, in this example, is galvanically-isolated by virtue of capacitors 108 providing DC isolation. The bus 107 of the present example comprises two bus wires. In examples not described, the transceiver 100 may have application in examples that include a non-galvanically isolated bus.

Figure 2:
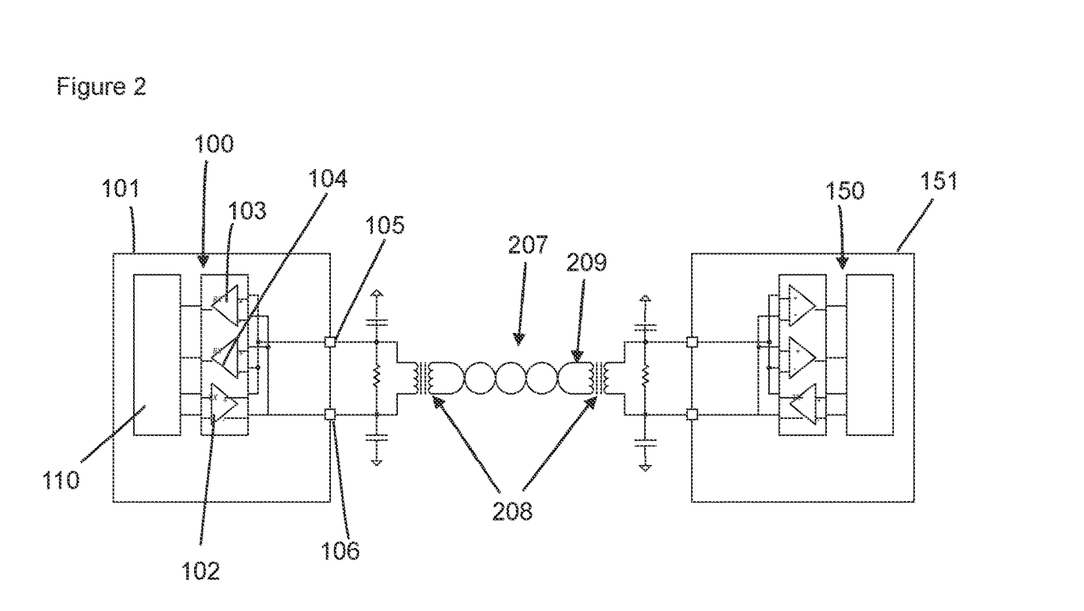
FIG. 2 shows a second example embodiment of a first transceiver and a second transceiver coupled to a galvanically-isolated bus.

Example FIG. 2 is substantially the same as FIG. 1 and the same reference numerals have been used. However, FIG. 2 shows a different example of a galvanically-isolated bus 207. In example FIG. 2, the bus is galvanically-isolated by virtue of transformers 208 which provide the DC isolation. The bus in example FIG. 2 comprises a twisted pair of bus wires 209.

In both FIG. 1 and FIG. 2, the bus 107, 207 connects the transceiver 100 and node 101 to a further transceiver 150 of a further node 151. The further transceiver 150 may or may not be substantially the same as the transceiver 100 described herein.

Returning to the description of the transmitter 102, the differential signal is provided by the transmitter 102 being configured to drive the two bus wires to different differential voltages. Thus, the transceiver 100 may be considered to comprise a differential transceiver 100.

The two receivers 103, 104 are configured to receive the differential signal, i.e. the differential voltages thereof, from the first terminal 105 and the second terminal 106. Given that the transmitter 102 and the receivers 103, 104 are coupled to the same first and second terminals 105, 106, the receivers 103, 104 are able to see what the transmitter 102 is transmitting. In this example, the one or more receivers 103, 104 are also configured to receive signals comprising differential voltages from the galvanically-isolated bus 107. In other examples (not shown), the receiver 103, 104 used by the signal balance module (described later) is configured to read back what the transmitter 102 is transmitting and is not coupled to the bus 107.

The transceiver 100 further comprises a controller 110. The controller 110 may comprise a digital controller configured to provide control signals to the transmitter 102 to cause the transmitter 102 to transmit the signals. The controller 110 may also be configured to receive received-signals from the two receivers 103, 104.

The signals or differential voltages that the transmitter 102, under the control of the controller 110 may be configured to transmit may be of the form of a plurality of symbols. Each symbol may comprises a predefined set of said differential voltages including at least a positive differential voltage and a negative differential voltage.

Figure 3:
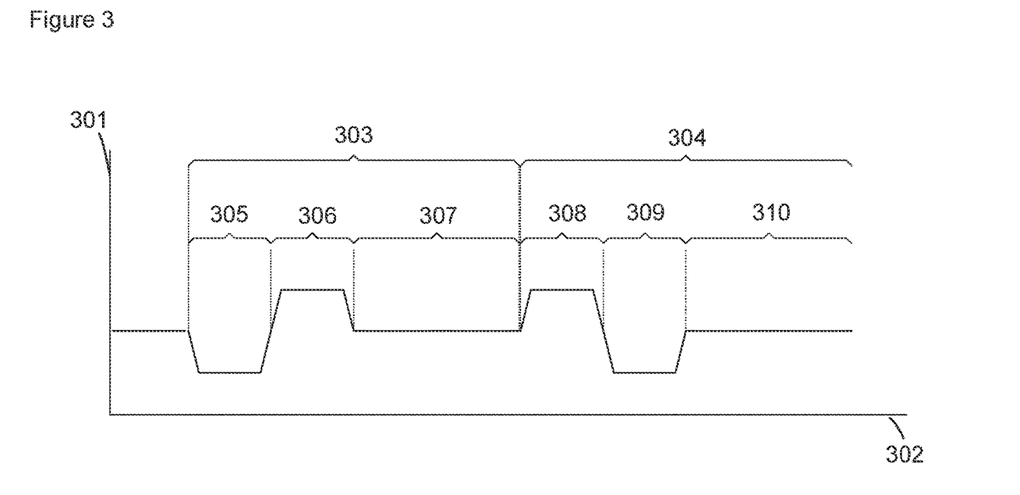
FIG. 3 shows a timing diagram illustrating the output of an example first-logic symbol and an example second-logic symbol.

FIG. 3 provides an example of two different symbols that the controller 110 and transmitter 102 may be configured to transmit. FIG. 3 shows a graph of differential bus voltage 301 versus time 302. There is shown a first-logic symbol 303 and a second-logic symbol 304. The first-logic symbol 303 may represent a logic zero. The second-logic symbol 304 may represent a logic one. Thus, communication over the bus 107, 207 may be provided by transmission and receipt of at least the first-logic symbol 303 and the second-logic symbol 304.

The first-logic symbol 303 comprises a first period 306 comprising the negative differential voltage and a subsequent second period 307 comprising the positive differential voltage. In the present example, the first-logic symbol further comprises a third period 307 directly subsequent the second period 306 in which a zero differential voltage is provided.

The second-logic symbol 304 comprises a first period 308, second period 309 and a third period 310, similar to the first-logic symbol. However, the second-logic symbol 304 differs from the first in that the first period 308 comprises the positive differential voltage and the subsequent second period 309 comprises the negative differential voltage. In the present example, the second-logic symbol 304 further comprises a third period 310 directly subsequent the second period 309 in which a zero differential voltage is provided.

It will be appreciated that the symbols used to represent logic one and logic zero states may, in other examples, take different forms. However, the present disclosure has application to symbols which include both at least one positive differential voltage and at least one negative differential voltage. It will also be appreciated that while FIG. 3 shows a first-logic symbol 303 followed by a second-logic symbol 304, the transceiver 100 can transmit the symbols in any order that is required to convey a message.

Ideally, the first period 305 has the same duration as the second period 306 in the first-logic symbol 303. That is the duration the bus is energised with a positive differential voltage is the same as the duration the bus is energised with a negative differential voltage. Likewise, ideally, the first period 308 has the same duration as the second period 309 in the second-logic symbol 304. That is the duration the bus is energised with a positive differential voltage is the same as the duration the bus is energised with a negative differential voltage. This may avoid voltage drift and improve the reliability of communication. In the present example, the third period happens to be twice the length of the first period or second period.

However, the bus 107, 207 and transceivers 100 may be subject to signal disturbance. The signal disturbance may be cause by external factors or limitations with the components of the transceiver 100. Thus, a non-ideal analog transmitter 102 may cause disturbance to the transmitted symbol. Alternatively or in addition, there may be discrepancies in the line components, such as the isolation capacitor(s) 108 or transformer(s) 208.

Figure 4:
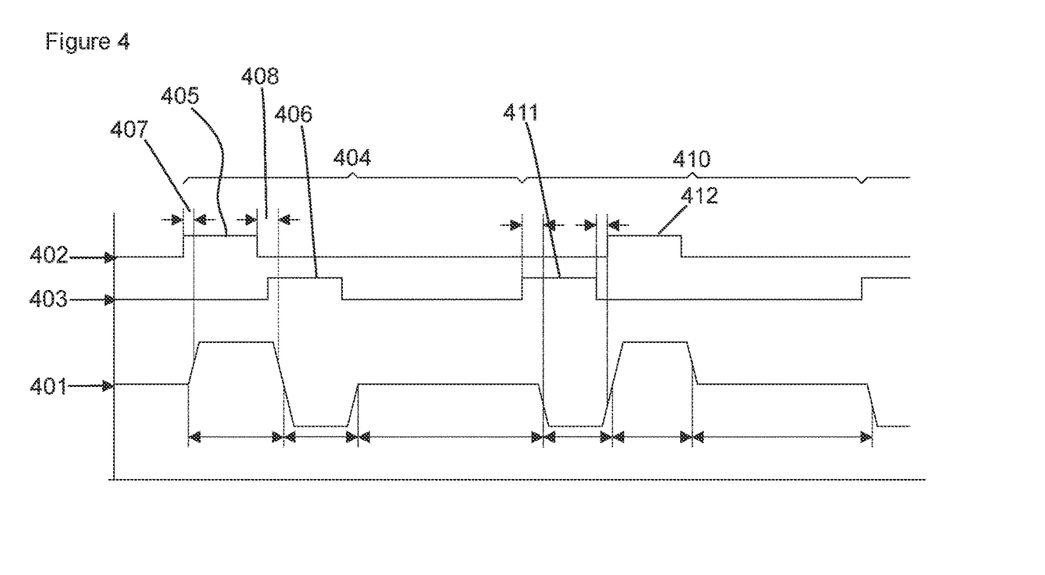
FIG. 4 shows a timing diagram illustrating signal distortion of the symbols.

FIG. 4 shows a timing diagram of voltage versus time illustrating signal distortion of the symbols. The diagram shows three different signals. Firstly, trace 401 shows the output of the transmitter 102 to the bus 107, 207. Secondly, a trace 402 shows a control signal generated by the controller 110 which is configured to cause the transmitter 102 to generate a positive differential voltage. Thirdly, a trace 403 shows a control signal generated by the controller 110 which is configured to cause the transmitter 102 to generate a negative differential voltage.

Looking at a first symbol 404, which in this example comprises the second-logic symbol or logic one, the control signal 405 and the control signal 406, which request the transmitter 102 to provide a positive differential voltage and a negative differential voltage respectively are substantially the same duration. However, perhaps due to signal distortions (whatever their source), the positive and negative differential voltages do not directly correspond in their duration. The driving of the bus 107, 207 to the positive differential voltage begins a time delay t_rise_hi 407 after the rising edge of signal 407. The falling edge of the positive differential voltage falls a time delay t_fall_hi 408 after the falling edge of the signal 407. This leads to a symbol on the bus shown in trace 401 that has, as an example, a first period that is 28% of the symbol time in the positive differential voltage state, a second period that is 22% in the negative differential voltage state and a third period that is 53% in the zero differential state (because it extends into the time of the next symbol).

Looking at a further, second, symbol 410 which in this example comprises the first-logic symbol or logic zero, the resultant signal that is transmitted has a first period that is 22% of the symbol time in the negative differential voltage state, a second period that is 28% in the positive differential voltage state and a third period that is 50% in the zero differential state.

In order to provide for a reduction in the difference between the time of the positive and negative differential voltages, the transceiver 100 includes a signal balance module. With reference to FIGS. 1 and 2, the signal balance module is not explicitly shown and may take different forms. For example, the signal balance module may be part of the controller 110. In another example, the signal balance module may be part of the transmitter 102. In another example, the signal balance module may be separate from and coupled to one or both of the controller 110 and the transmitter 102. In another examples, the signal balance module may be part of both the controller 110 and the transmitter 102.

In whichever way the signal balance module is implemented, it may be configured to provide the following functionality for one or more symbols. In the examples of the present disclosure, the signal balance module may be configured to perform the following for each, single symbol transmitted by the transmitter 102. In other examples, not described in detail, the signal balance module may be configured to make the determinations described below for a plurality of symbols before perhaps taking an average, and then taking control or making a modification based on the average.

However, returning to the current example, the signal balance module may be configured to perform the following for a first symbol transmitted by the transmitter 102.

Figure 5:
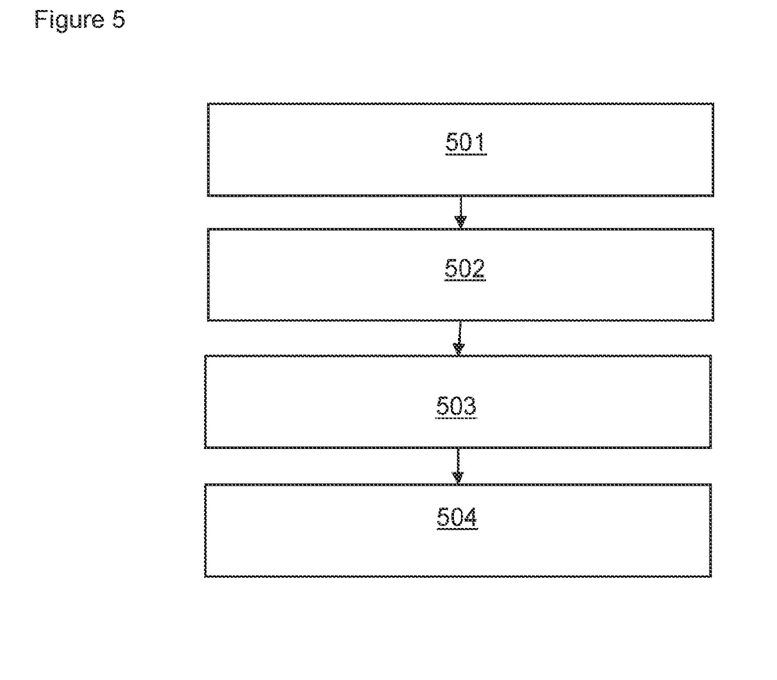
FIG. 5 shows a block diagram illustrating the operation of a signal balance module.
Figure 6:
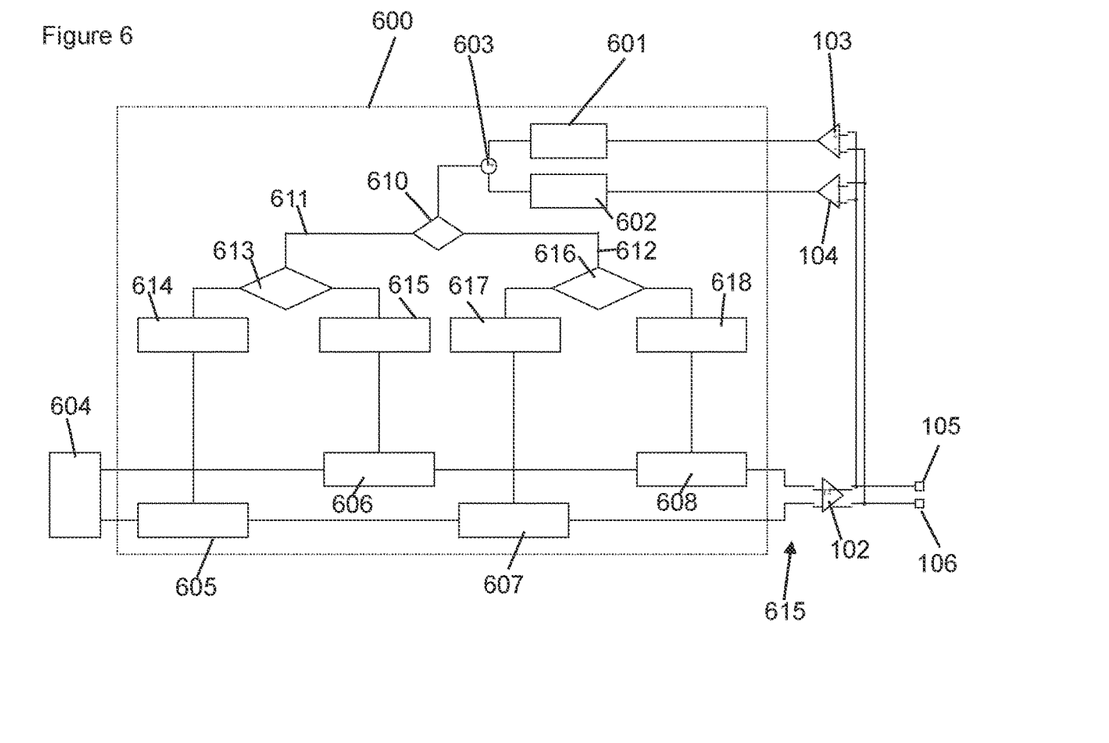
FIG. 6 shows an example implementation of a signal balance module.

With reference to FIGS. 5 and 6, the signal balance module is configured to determine a first duration 501 comprising the duration of the positive differential voltage of the first symbol transmitted by said transmitter 102 and received by the at least one receiver 103, 104. Thus, because the first duration is determined based on what is received by the receiver 103, 104, any signal distortion introduced by the transmitter 102 can be seen. The signal balance module 600 may include a timer 601 for determining said first duration.

The signal balance module 600 is configured to determine a second duration 502 comprising the duration of the negative differential voltage of the first symbol transmitted by said transmitter 102 and received by the at least one receiver 103, 104. The signal balance module 600 may include a second timer 602 for determining said second duration. Alternatively the same timer may be used to determine the first and second durations.

It will be appreciated that steps 501 and 502 may be performed in a different order depending on whether the first symbol includes a first period 305, 308 that includes a positive differential voltage or a negative differential voltage.

The signal balance module 600 may be configured to base further action on whether there is a difference, which may be a difference above a threshold level, between the first duration and the second duration of the first symbol, wherein the determination of the difference comprises step 503. The signal balance module 600 may include a difference calculation block 603 that receives the first and second durations determined by the timer(s) 601, 602. If there is no difference in the first duration and the second duration, the signal balance module may take no action and move on to performing the steps 501, 502 and 503 mentioned above on a next symbol.

However, if a difference is detected, the signal balance module 600 may be configured to perform a control action 504 that acts on one or both of the controller 110 and the transmitter 102 that reduces the difference between the first duration and the second duration for a subsequently transmitted symbol, e.g. a directly subsequent symbol e.g. 304 after the first symbol e.g. 303.

The signal balance module 600 may implement the control action in a number of ways.

In a first example, the signal balance module 600 may be configured to provide for modification of the control signals generated by the controller 110 and applied to the transmitter 102 for transmitting a further symbol subsequent to the first symbol (or more generally, the "one or more symbols"). Thus, the signal balance module 600 may modify the duration of the control signals 411 and 412 by causing the controller 110 to generate them with different durations. Alternatively, the signal balance module 600 may modify the control signals 411 and 412 by adjusting their respective duration(s) between the controller 110 and the transmitter 102.

In a second example, the signal balance module 600 may be configured to control transmitter 102 when it transmits a further symbol subsequent to said first symbol. Thus, in this second example, rather than modify the control signals, the signal balance module 600 may be configured to control the transmitter's reaction to the control signals. In one or more examples, the transmitter includes an encoder 604 that generates the voltages of the first, second and third periods 308, 309, 310 and the signal balance module 600 changes the duration for which the positive and/or negative differential voltages are provided.

Thus, to summarise, the signal balance module may provide for one of: modification of the control signals applied to the transmitter for transmitting a further symbol subsequent to said one or more symbols; and control of the transmitter when it transmits a further symbol subsequent to said one or more symbols. However, as mentioned, whichever way the control action is implemented, the signal balance module 600 may be configured to reduce the difference between the first duration and the second duration in a subsequent symbol, e.g. the next symbol, after the first symbol. Accordingly, the duration of the positive differential voltage of the further symbol transmitted by said transmitter and the duration of the negative differential voltage of the further symbol transmitted by said transmitter is configured to be more equal relative to the difference determined for the one or more symbols.

In one or more examples, the reduction of the difference may be achieved by controlling the duration of one or both of the positive differential voltage and the negative differential voltage of the further symbol based on the difference (i.e. time difference) determined for the one or more symbols. Thus, the change in duration(s) implemented in the further symbol may be substantially equal to the difference determined for the one or more symbols.

It will be appreciated that when the signal balance module 600 moves on to perform steps 501-504 for the next symbol, it may find no or a reduced difference between the first duration and second duration in the subsequent symbol. If so, the signal balance module 600 may be configured to take no action by maintaining the control action that is applied, because it has resulted in a voltage-balanced subsequent symbol. Alternatively, if a further control action is required, it may make a further attempt to reduce the difference between the first duration and the second duration in a still subsequent symbol.

In one or more examples, it may be assumed that the receiver 103, 104 does not introduce a signal distortion or that it is sufficiently small to be neglected.

We will now describe a digital implementation of the signal balance module 600. In such an implementation, said signal modification module may be integrated with the controller 110, although other implementations are possible.

As seen with reference to FIG. 4, the control signals output by the controller 110 may comprise digital signals and may comprise at least a first digital signal (see instances 405, 412 in trace 402) and a second digital signal (see instances 406, 411 in trace 403). The transmitter 102 is configured to transmit, or drive the first and second terminals 105, 106 to, the positive differential voltage based on receipt of the first digital signal and transmit, or drive the first and second terminals to, the negative differential voltage based on receipt of the second digital signal, as shown by the corresponding differential voltages in trace 401.

Thus, in this example, the signal modification module is configured to provide for modification of the duration of one or both of the first digital signal and the second digital signal to provide said reduction in the difference between the first duration and the second duration. In one or more examples, only one of the first and second digital signals is modified, which comprise the control signal present during the second period 306, 309. Either way, there is provided a reduction in the difference between the first and second duration for the subsequent symbol relative to the first symbol or, more generally, relative to the one or more symbols for which the first and second durations were measured prior to the control action. In the digital implementation, the signal modification module may be configured to measure the first and second durations using a clock of the digital controller 110. The signal modification module may be configured to change the length of the control signals using a determined number of periods of the clock when attempting to reduce the difference between the first duration and the second duration.

We will now describe an analog implementation of the signal balance module 600, which is what is shown in example FIG. 6.

In such an implementation the signal modification module 600 may be configured to provide for control of the transmitter 102 such that the duration of one or both of the positive differential voltage output in response to the first control signal and the negative different voltage output in response to the second control signal is modified to provide said reduction in the difference between the first duration and the second duration. Thus, in this example, the control signals provided by the controller 110 may remain the same and it may be the response of the transmitter 102 to the control signals that is modified to effect the reduction in the difference between the first duration and the second duration.

In example FIG. 6, the control signals from the controller 102 are received by the encoder 604 which interprets the control signals to control the transmitter 102. The signal modification module 600 may include four duration modification blocks 605, 606, 607 and 608 for modifying the duration of the signals from the encoder 604 to cause the transmitter 102 to output the subsequent symbol with the modified durations of the positive/negative differential voltages, which results in the reduction in the difference between the first and second durations for the subsequent symbol relative to the first symbol. However, modification of the output of the encoder may be achieved with one programmable block or in other ways, as will be appreciated by those skilled in the art.

In one or more examples, the output of the difference calculation block 603 is received by block 610 which is configured to determine whether the first duration (duration of the positive differential voltage) was greater than the second duration (duration of the negative differential voltage) or if the second duration (duration of the negative differential voltage) was greater than the first duration (duration of the positive differential voltage). If the first duration was greater, then the signal balance module 600 provides the functionality indicated by path 611. If the second duration was greater, then the signal balance module 600 provides the functionality indicated by path 612.

Block 613 is configured to determine which of the first-logic symbol and the second-logic symbol is the next symbol to be transmitted.

If the next symbol is the second-logic symbol (first period: positive differential, second period: negative differential voltage, third period: zero differential voltage), the module 600 proceeds to calculation block 614.

The calculation block 614 is configured to determine an increased duration of the second period, such that it is likely to match the first period, when transmitted. The calculation block 614 therefore determines the modified second period duration by addition of the magnitude of the difference calculated by the difference calculation block 603 to the predetermined (i.e. undistorted, i.e. default) duration of the second period. The output of the calculation block 614 is provided to the duration modification block 605, which modifies the duration of the second period for the next symbol.

Figure 7:
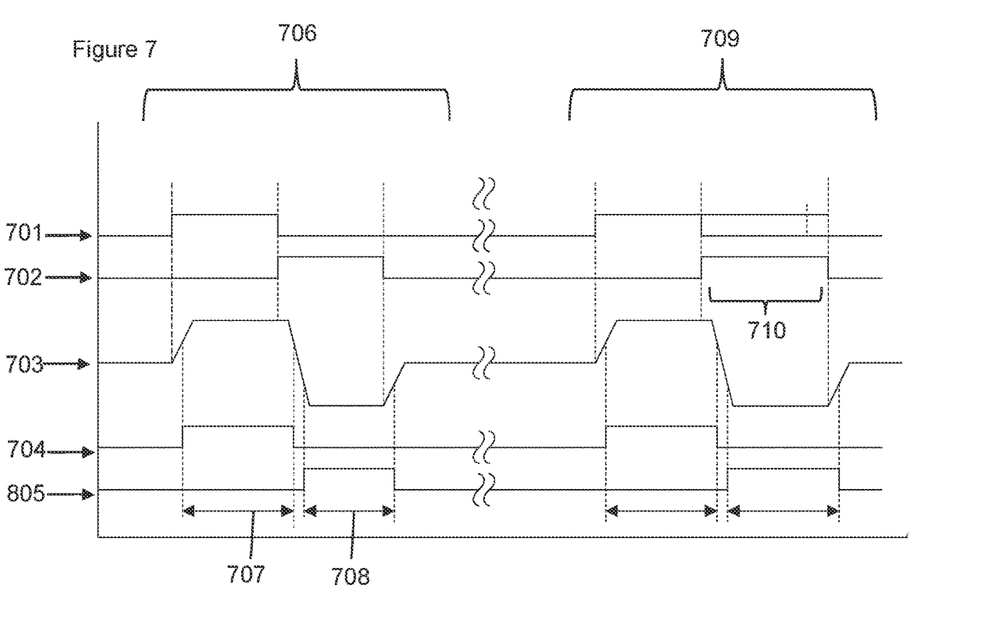
FIG. 7 shows a timing diagram illustrating an example effect of the signal balance module for a first symbol and a subsequent further symbol.

This process is shown in example FIG. 7. FIG. 7 shows various signals on the y-axis against time. Trace 701 shows the control signal provided to cause the transmitter 102 to generate a positive differential voltage, after the control signal has passed through the signal balance module 600, such as at point 615 (shown in FIG. 6). Trace 702 shows the control signal provided to cause the transmitter to generate a negative differential voltage after passing through the signal balance module 600, such as at point 615 (shown in FIG. 6). Trace 703 shows the output of the transmitter 102 as seen by the receivers 103, 104. Trace 704 shows the received-signal indicative of the detection of a positive differential voltage by the receiver 103. Trace 705 shows the received-signal indicative of the detection of a negative differential voltage by the receiver 104.

In the first symbol 706, the signal balance module determines that the first duration 707 is greater than the second duration 708. Accordingly, the difference between the durations is calculated by block 603 and the duration modification block 605 modifies the duration of the second period for the subsequent symbol, that is next symbol 709. Thus, in next symbol 709, the second period comprising the negative differential voltage, which is increased by the difference determined by block 603. Accordingly, the difference between the first duration (duration of the positive differential voltage) and the second duration (duration of the negative differential voltage) for symbol 709 is reduced, and, in this example, the durations are made substantially equal.

Moving back to block 613, if the next symbol is the first-logic symbol (first period: negative differential, second period: positive differential voltage, third period: zero differential voltage), the module 600 proceeds to calculation block 615.

The calculation block 615 is configured to determine a decreased duration of the second period, such that it is likely to match the first period, when transmitted. The calculation block 615 therefore determines the modified second period duration by subtraction of the magnitude of the difference calculated by difference calculation block 603 from the predetermined (i.e. undistorted, i.e. default) duration of the second period. The output of the calculation block 615 is provided to the duration modification block 606, which modifies the duration of the second period for the next symbol.

Figure 8:
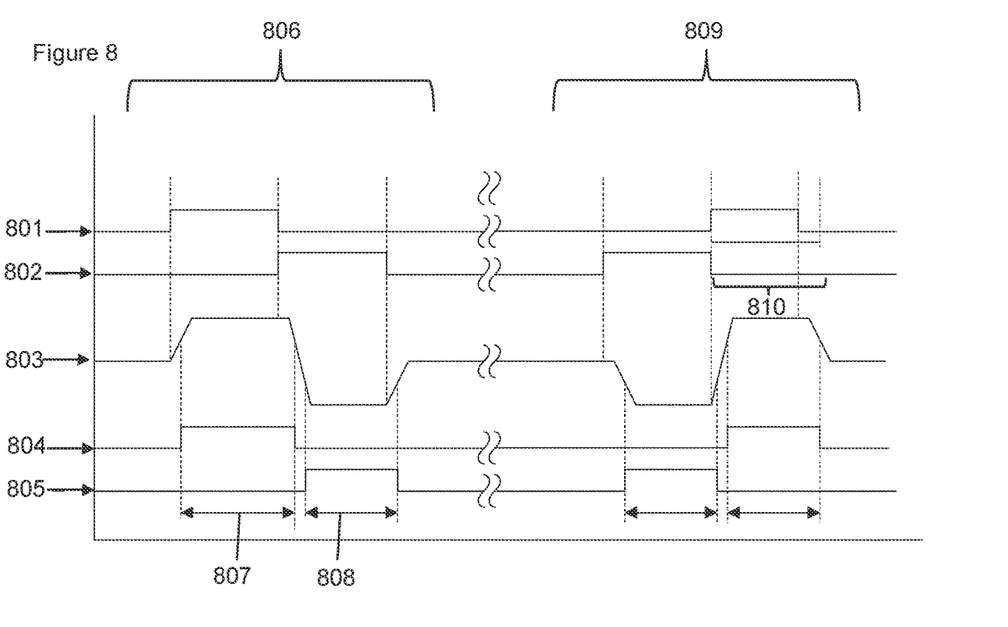
FIG. 8 shows a timing diagram illustrating an example effect of the signal balance module for a first symbol and a subsequent further symbol.

This process is shown in example FIG. 8. FIG. 8, similar to FIG. 7, shows various signals in the y-axis against time. Trace 801 shows the control signal provided to cause the transmitter to generate a positive differential voltage after passing through the signal balance module 600, such as at point 615 (shown in FIG. 6). Trace 802 shows the control signal provided to cause the transmitter to generate a negative differential voltage after passing through the signal balance module 600, such as at point 615 (shown in FIG. 6). Trace 803 shows the output of the transmitter 102 as seen by the receivers 103, 104. Trace 804 shows the received-signal indicative of the detection of a positive differential voltage by the receiver 103. Trace 805 shows the received-signal indicative of the detection of a negative differential voltage by the receiver 104.

In the first symbol 806, the signal balance module determines that the first duration 807 is greater than the second duration 808. Accordingly, the difference between the durations is calculated by block 603 and the duration modification block 606 modifies the duration of the second period for the subsequent symbol, that is next symbol 809. Thus, in next symbol 809, the second period 810 comprising the positive differential voltage is decreased by the magnitude of the difference determined by block 603. Accordingly, the difference between the first duration (duration of the positive differential voltage) and the second duration (duration of the negative differential voltage) for symbol 809 is reduced relative to symbol 808 and, in this example, the durations are made substantially equal.

Returning to block 610, as mentioned earlier, if the second duration (the negative differential voltage) was greater in duration, then the signal balance module 600 provides the functionality indicated by the path 612.

Block 616 is configured to determine which of the first-logic symbol and the second-logic symbol is the next symbol to be transmitted.

If the next symbol is the second-logic symbol (first period: positive differential voltage, second period: negative differential voltage, third period: zero differential voltage), the module 600 proceeds to calculation block 617.

The calculation block 617 is configured to determine a decreased duration of the second period, such that it is likely to match the first period, when transmitted. The calculation block 617 therefore determines the modified second period duration by subtraction of the magnitude of the difference calculated by difference calculation block 603 from the predetermined (i.e. undistorted, default) duration of the second period. The output of the calculation block 617 is provided to the duration modification block 607, which modifies the duration of the second period for the next symbol.

Figure 9:
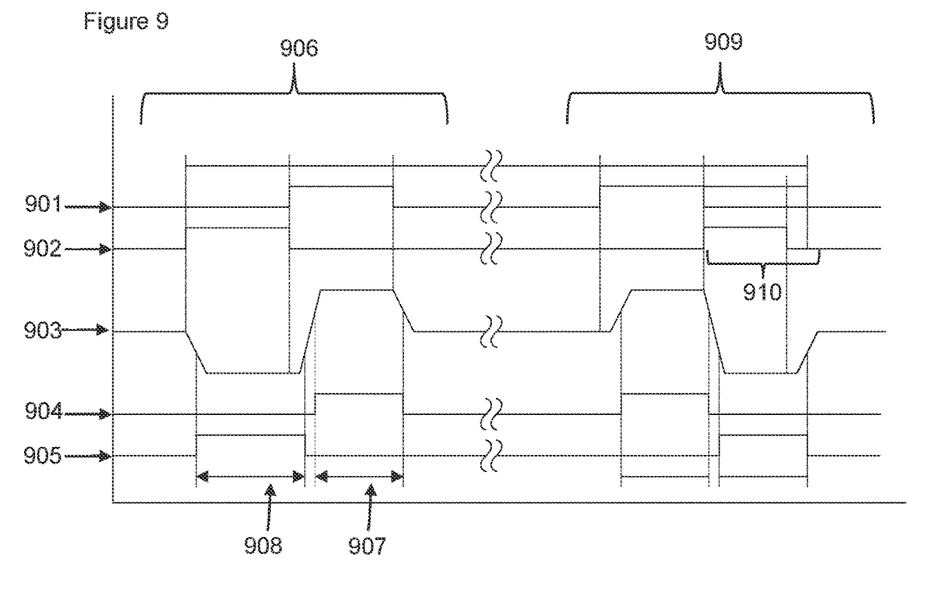
FIG. 9 shows a timing diagram illustrating an example effect of the signal balance module for a first symbol and a subsequent further symbol.

This process is shown in example FIG. 9. FIG. 9 shows various signals in the y-axis against time. Trace 901 shows the control signal provided to cause the transmitter to generate a positive differential voltage after passing through the signal balance module 600, such as at point 615 (shown in FIG. 6). Trace 902 shows the control signal provided to cause the transmitter to generate a negative differential voltage after passing through the signal balance module 600, such as at point 615 (shown in FIG. 6). Trace 903 shows the output of the transmitter 102 as seen by the receivers 103, 104. Trace 904 shows the received-signal indicative of the detection of a positive differential voltage by the receiver 103. Trace 905 shows the received-signal indicative of the detection of a negative differential voltage by the receiver 104.

In the first symbol 906, the signal balance module 600 determines that the second duration 908 (negative differential voltage duration) is greater than the first duration 907. Accordingly, the difference between the durations is calculated by block 603 and the duration modification block 607 modifies the duration of the second period for the subsequent symbol, that is next symbol 909. Thus, in next symbol 909, the second period 910 comprising the negative differential voltage is increased by the difference determined by block 603. Accordingly, the difference between the first duration (duration of the positive differential voltage) and the second duration (duration of the negative differential voltage) for symbol 909 is reduced relative to symbol 906 and, in this example, the durations are made substantially equal.

Moving back to block 616, if the next symbol is the first-logic symbol (first period: negative differential, second period: positive differential voltage, third period: zero differential voltage), the module 600 proceeds to calculation block 618.

The calculation block 618 is configured to determine an increased duration of the second period, such that it is likely to match the first period, when transmitted. The calculation block 618 therefore determines the modified second period duration by addition of the magnitude of the difference calculated by difference calculation block 603 from the predetermined (i.e. undistorted, default) duration of the second period. The output of the calculation block 618 is provided to the duration modification block 608, which modifies the duration of the second period for the next symbol.

Figure 10:
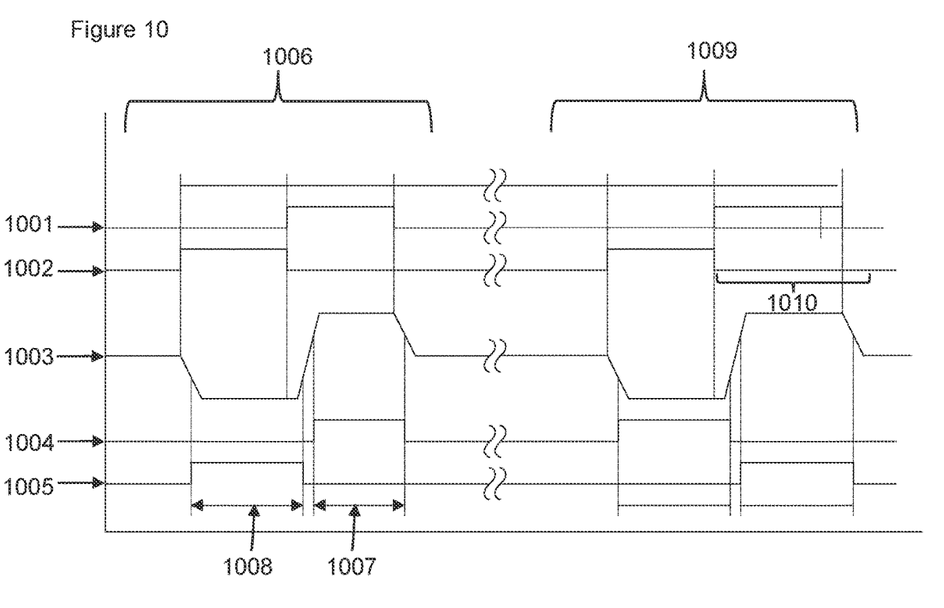
FIG. 10 shows a timing diagram illustrating an example effect of the signal balance module for a first symbol and a subsequent further symbol.

This process is shown in example FIG. 10. FIG. 10 shows various signals in the y-axis against time. Trace 1001 shows the control signal provided to cause the transmitter to generate a positive differential voltage after passing through the signal balance module 600, such as at point 615 (shown in FIG. 6). Trace 1002 shows the control signal provided to cause the transmitter to generate a negative differential voltage after passing through the signal balance module 600, such as at point 615 (shown in FIG. 6). Trace 1003 shows the output of the transmitter 102 as received by the receivers 103, 104. Trace 1004 shows the received-signal indicative of the detection of a positive differential voltage by the receiver 103. Trace 1005 shows the received-signal indicative of the detection of a negative differential voltage by the receiver 104.

In the first symbol 1006, the signal balance module 600 determines that the second duration 1008 (duration of the negative differential voltage) is greater than the first duration 1007. Accordingly, the difference between the durations is calculated by block 603 and the duration modification block 608 modifies the duration of the second period for the subsequent symbol, that is next symbol 1009. Thus, in next symbol 1009, the second period 1010 comprising the positive differential voltage is increased by the magnitude of the difference determined by block 603. Accordingly, the difference between the first duration (duration of the positive differential voltage) and the second duration (duration of the negative differential voltage) for symbol 1009 is reduced and, in this example, the durations are made substantially equal.

Thus, in the examples described with reference to FIGS. 7 to 10, the signal balance module is configured to provide said reduction in the difference between the first duration and the second duration in the further symbol 709, 809, 909, 1009 relative to the first symbol 706, 806, 906, 1006 by control of the duration of the second period 710, 810, 910, 1010.

In other examples, not shown with a specific figure, the signal balance module 600 may be configured to provide said reduction in the difference between the first duration and the second duration in the further symbol by control of the duration of the first period. However, in this example, it may be preferable to control the second period, if the first period is used for synchronization of the one or more receivers 103, 104 and/or the controller 110.

It will be appreciated that the signal balance module 600 may be configured to repeatedly perform said determination of the first duration, determination of the second duration and determination of said difference for each symbol caused to be transmitted by the controller and the transmitter. Thus, in a subsequent cycle, the signal balance module 600 will receive symbol 709, 809, 909 and 1009 as the first symbol to determine any difference between the first and second durations. In this way, the signal balance module 600 may be configured to iteratively adjust the modification made to the duration of the second period (or other part of the subsequent symbol in other examples) to reduce the difference between the positive and negative differential voltages in each symbol.

The transceiver 100 may comprise part of a node 101 of a battery management system, wherein said node provides for communication between one or more other nodes of the battery management system, such as between a plurality of battery cells and a battery management system controller. The node 101 may be configured for monitoring of electrical parameters of one or more battery cells, such as an individual cell, a group of cells or a cell stack. As will be appreciated by those skilled in the art of battery management systems, the node 101 may be a battery charge controller; or the node 101 may comprise a battery management system controller; or the node 101 may comprise a battery junction box.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver comprising:
   a transmitter configured to transmit a signal comprising differential voltages to at least a first terminal and a second terminal, the first and second terminals configured to be coupled to a galvanically-isolated bus;
   at least one receiver configured to receive the differential voltages from the first terminal and the second terminal;
   a controller configured to provide control signals to the transmitter to cause the transmitter to transmit symbols, wherein each symbol comprises a predefined set of said differential voltages including at least a positive differential voltage and a negative differential voltage; and
   a signal balance module configured, for one or more symbols, to:
      determine a first duration comprising the duration of the positive differential voltage of said one or more symbols transmitted by said transmitter and received by the at least one receiver;
      determine a second duration comprising the duration of the negative differential voltage of said one or more symbols transmitted by said transmitter and received by the at least one receiver;
      based on determination of a difference between the first duration and the second duration of said one or more symbols, provide for one or both of control of the controller or control of the transmitter to reduce the difference between the duration of the positive differential voltage of a further symbol transmitted by said transmitter and the duration of the negative differential voltage of said further symbol transmitted by said transmitter relative to the difference determined for the one or more symbols.

2. The transceiver of claim 1, wherein
   said control signals comprise digital signals comprising at least a first digital signal and a second digital signal provided by the controller to the transmitter and wherein the transmitter is configured to transmit the positive differential voltage based on receipt of the first digital signal and transmit the negative differential voltage based on receipt of the second digital signal.

3. The transceiver of claim 2, wherein said signal balance module is configured to provide for modification of the duration of one or both of the first digital signal and the second digital signal to provide a reduction in the difference between the first duration and the second duration.

4. The transceiver of claim 2, wherein said signal balance module is integrated with said controller.

5. The transceiver of claim 2, wherein said signal module is configured to provide for control of the transmitter such that the duration of one or both of the positive differential voltage output in response to the first control signal and the negative different voltage output in response to the second control signal is modified to provide a reduction in the difference between the first duration and the second duration.

6. The transceiver of claim 1, wherein said symbols that the controller is configured to cause the transmitter to transmit, by provision of said control signals, comprise:
   a first-logic symbol of said symbols, the first-logic symbol comprising a first period comprising the negative differential voltage and a subsequent second period comprising the positive differential voltage; and
   a second-logic symbol of said symbols, the second-logic symbol comprising a first period comprising the positive differential voltage and a subsequent second period comprising the negative differential voltage.

7. The transceiver of claim 6, wherein the signal balance module is configured to provide a reduction in the difference between the first duration and the second duration in the further symbol by control of the duration of the second period.

8. The transceiver of claim 6, wherein the signal balance module is configured to provide for control of the duration of the second period in the further symbol by one of addition or subtraction of the difference determined to be present between the first duration and the second duration of said one or more symbols.

9. The transceiver of claim 1, wherein the signal balance module is configured to repeatedly perform said determination of the first duration, determination of the second duration and determination said difference for each symbol caused to be transmitted by the controller and the transmitter and wherein said further symbol comprises a next symbol for transmission.

10. The transceiver of claim 6, wherein the signal balance module is configured to:
    based on the first duration being greater than the second duration for said one or more symbols:
       if the further symbol comprises a first-logic symbol, provide for a decrease in the duration of the second period of the further symbol comprising the positive differential voltage based on said difference between the first duration and the second duration; and
       if the further symbol comprises a second-logic symbol, provide for an increase in the duration of the second period of the further symbol comprising the negative differential voltage based on said difference between the first duration and the second duration.

11. The transceiver of claim 6, wherein the signal balance module is configured to:
    based on the first duration being less than the second duration for said one or more symbols:
       if the further symbol comprises a first-logic symbol, provide for an increase in the duration of the second period of the further symbol comprising the positive differential voltage based on said difference between the first duration and the second duration; and
       if the further symbol comprises a second-logic symbol, provide for a decrease in the duration of the second period of the further symbol comprising the negative differential voltage based on said difference between the first duration and the second duration.

12. The transceiver of claim 1, wherein the transceiver comprises part of a node of a battery management system, wherein said node provides for one or both of:
    communication between one or more other nodes of the battery management system; and
    monitoring of electrical parameters of one or more battery cells.

13. The transceiver of claim 1, wherein said modification of the control signals and said control of the transmitter to reduce the difference between the first duration and the second duration comprises a reduction by the determined difference between the first duration and the second duration of said one or more symbols.

14. The transceiver of claim 1, wherein the signal balance module is configured to provide a reduction of the difference by controlling the duration of one or both of the positive differential voltage and the negative differential voltage of the further symbol based on the difference determined for the one or more symbols.

15. A method for a transceiver, wherein the transceiver comprises a transmitter configured to transmit a signal comprising differential voltages to at least a first terminal and a second terminal, the first and second terminals configured to be coupled to a galvanically-isolated bus; at least one receiver configured to receive the differential voltages from the first terminal and the second terminal; a controller configured to provide control signals to the transmitter to cause the transmitter to transmit symbols, wherein each symbol comprises a predefined set of said differential voltages including at least a positive differential voltage and a negative differential voltage; wherein the method comprises, for one or more symbols:

determining, by a signal balance module, a first duration comprising the duration of the positive differential voltage of said one or more symbols transmitted by said transmitter and received by the at least one receiver;

determining, by a signal balance module, a second duration comprising the duration of the negative differential voltage of said one or more symbols transmitted by said transmitter and received by the at least one receiver;

based on determination of a difference between the first duration and the second duration of said one or more symbols, providing for one or both of control of the controller or control of the transmitter to reduce the difference between the duration of the positive differential voltage of a further symbol transmitted by said transmitter and the duration of the negative differential voltage of said further symbol transmitted by said transmitter relative to the difference determined for the one or more symbols.

16. The method of claim 15, wherein the method comprises one of: modifying the control signals provided to the transmitter from the controller to effect a reduction in the difference between the first duration and the second duration in said further symbol relative to the one or more symbols; and controlling the response of the transmitter to the control signals such that the transmitter acts to reduce difference between the first duration and the second duration in a further symbol relative to the one or more symbols.

17. The method of claim 15, wherein said control signals comprise digital signals comprising at least a first digital signal and a second digital signal provided by the controller to the transmitter and wherein the transmitter is configured to transmit the positive differential voltage based on receipt of the first digital signal and transmit the negative differential voltage based on receipt of the second digital signal.

18. The method of claim 17, wherein said method comprises providing for modification of the duration of one or both of the first digital signal and the second digital signal to provide a reduction in the difference between the first duration and the second duration.

19. The method of claim 15, wherein said method comprises providing for control of the transmitter such that the duration of one or both of the positive differential voltage output in response to the first control signal and the negative different voltage output in response to the second control signal is modified to provide a reduction in the difference between the first duration and the second duration.

20. The method of claim 15, wherein said symbols that the controller is configured to cause the transmitter to transmit, by provision of said control signals, comprise:

a first-logic symbol of said symbols, the first-logic symbol comprising a first period comprising the negative differential voltage and a subsequent second period comprising the positive differential voltage; and a second-logic symbol of said symbols, the second-logic symbol comprising a first period comprising the positive differential voltage and a subsequent second period comprising the negative differential voltage.

\* \* \* \* \*